J. H. LOCK.
MEANS FOR CONTROLLING VEHICLE TRAINS.
APPLICATION FILED SEPT. 20, 1918.
1,302,686.
Patented May 6, 1919.
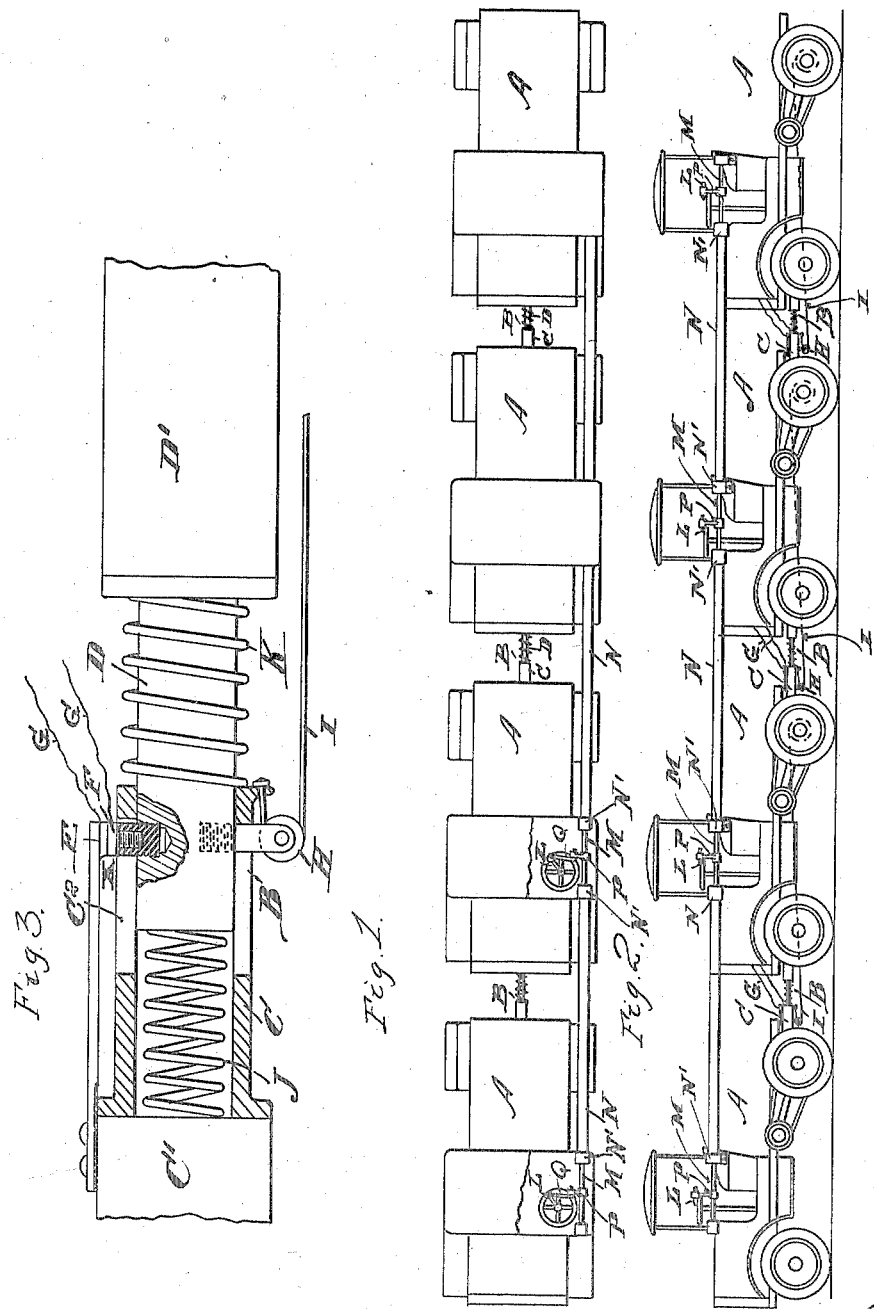
Witness
Inventor
John H. Lock
By J. E. Thomas
Attorney

UNITED STATES PATENT OFFICE.

JOHN H. LOCK, OF DETROIT, MICHIGAN.

MEANS FOR CONTROLLING VEHICLE-TRAINS.

1,302,686.   Specification of Letters Patent.   Patented May 6, 1919.

Application filed September 20, 1918. Serial No. 254,908.

*To all whom it may concern:*

Be it known that I, JOHN H. LOCK, citizen of the United States, residing at Detroit, county of Wayne, State of Michigan, have invented a certain new and useful Improvement in Means for Controlling Vehicle-Trains, and declare the following to be a full, clear, and exact description of the same, such as will enable others skilled in the art to which it pertains to make and use the same, reference being had to the accompanying drawings, which form a part of this specification.

My invention relates to means for controlling vehicle trains, shown in the accompanying drawings and more particularly set forth in the following specification and claims.

On account of the shortage in transportation facilities it has been the practice of late among automobile manufacturers to deliver vehicles to distant points by driving them to their destination. This however necessitates a driver for each car, and as many vehicles are frequently shipped simultaneously to the same destination it involves the employment for each shipment of a large force of men to handle the cars, who after their delivery must return to the factory by railroad at a considerable expenditure of time, effort and money.

It is therefore the object of this invention to provide means whereby a single driver in the forward car of a train of vehicles may control the operation of the respective cars that they may be actuated under their own power, and respectively brought under the control of their own brake by the driver of the leading car.

With the foregoing and other objects in view, which will appear as the description proceeds, the invention resides in the combination and arrangement of parts, and in the details of construction hereinafter described and claimed, it being understood that changes may be made in the precise embodiment herein disclosed without departing from the spirit of the invention.

In the accompanying drawings:—

Figure 1 is a diagrammatic plan view of a train of vehicles, with means installed for controlling their operation from the forward vehicle.

Fig. 2 is a side elevation of the same.

Fig. 3 is a detail view with parts in section of the draw bar, electric switch or circuit breaker, and brake control connection between the respective cars.

Referring now to the letters of reference placed upon the drawings—

A, denotes a plurality of motor driven vehicles respectively connected together to form a train.

B, indicates a draw-bar connection between each vehicle, consisting of a socket member C secured to a steering bar $C^1$ on the forward vehicle, and which is adapted to receive a co-acting plunger member D, secured to a steering bar $D^1$ at the forward end of the car directly following in the rear.

E, is a pole or contact point of an electric circuit breaker or switch X, suitably mounted upon the frame $C^1$ and socket member C, but insulated therefrom.

F, is a contact point carried by and insulated from the plunger D extending through a slotted opening $C^2$ in the socket member C that it may engage the contact point F to close an electric circuit through the wires G leading to the ignition system (not shown) of the car immediately following.

H, denotes a pulley journaled in a bracket $H^1$ carried by the plunger D, projecting through another slotted opening in the socket member; and I indicates a cable passing around the pulley and secured at one end of the socket member and at the other end to the brake controlling mechanism (not shown) of the car directly in the rear.

J, designates a spring housed within the socket member C adapted to act upon the end of the plunger, which in conjunction with a like spring K, carried by the plunger and bearing against the end of the socket member, serves to maintain the respective contact poles or points of the circuit breaker or switch X normally in closed relation.

L, indicates the usual gas control lever of the respective cars.

M, is a flexible shaft extending throughout the length of the train, housed in the sections of a flexible tube N, spaced apart and supported by suitable brackets $N^1$ secured to the respective vehicles.

P, denotes a plurality of rocker arms, respectively secured to the shaft M,—between the sections of the flexible tube N,—connected by links Q with the respective gas control levers L.

Having now indicated the several parts by reference letters, the construction and operation of the device will be readily understood.

The gas control levers of the several cars are adjusted and connected by means of their respective connecting links with the rocker arms carried by the flexible shaft, whereby upon the operation of the gas lever in the forward car a similar adjustment is effected in each of the cars following.

The engines of the respective cars having been put into operation, the driver may control the operation of all of the cars forming the train through the gas control lever in the forward car. Should the speed however of any of the cars forming the train exceed that of the leading car, the plunger D will be forced forward into the socket member C of its draw-bar and thereby break the electric circuit of the ignition system through the circuit breaker X, and simultaneously the pulley H also forced forward by the movement of the plunger,—acting upon the cable I, will cause the brakes of the car to be applied until the movement of the respective cars shall again become normal.

It will now be seen that a single driver may effectively control the operation of a train of several cars, and that the motive power of each car can be employed so that sufficient power may be developed for operation over roads which would otherwise be impassable if the cars connected with the forward or driver's car were merely "trailers."

Having thus described my invention what I claim is:

1. The combination of a plurality of internal combustion motor driven vehicles, means for connecting the respective vehicles together to form a train, circuit breaking means for controlling the ignition circuit for the internal combustion motors of the respective vehicles adapted to be operated through the movement of the respective vehicles with reference to each other, and manually operable means connected with the controlling means of the prime movers of the several vehicles, whereby upon the operation of the controlling means of one vehicle the controlling means of the respective vehicles may be simultaneously operated.

2. The combination of a plurality of internal combustion motor driven vehicles, means for connecting the respective vehicles together to form a train, consisting of a draw-bar comprising a socket member adapted to be attached to one vehicle and a co-acting plunger member adapted to be secured to the connecting vehicle, a spring housed in the socket member to receive the thrust of the plunger, a spring sleeved upon the plunger to receive the thrust of the socket member, and an electric circuit breaker controlling the ignition circuit for the respective motors operable through a change in the predetermined spaced relation of the vehicles to each other while in motion.

3. The combination of a plurality of internal combustion motor driven vehicles, means for connecting the several vehicles together to form a train, gas control levers for the respective motors, a flexible shaft suitably supported extending the length of the train, a plurality of rocker arms mounted upon said shaft, and links connecting the respective rocker arms with the gas control levers, whereby upon manually operating one of said levers the other controlling levers may be manually operated.

4. The combination of a plurality of internal combustion motor driven vehicles, means for connecting the several vehicles together to form a train, gas control levers for the respective motors, a flexible shaft extending the length of the train, a flexible tube formed in sections and spaced apart through which the flexible shaft extends, a rocker arm secured to the shaft between the spaced sections of the tube, and a link connecting each rocker arm with a gas controlling lever, whereby upon the operation of one of the levers the other levers may be simultaneously operated.

5. The combination of a plurality of internal combustion motor driven vehicles, means for connecting the respective vehicles together to form a train, consisting of a draw-bar comprising a socket member adapted to be attached to one vehicle and a co-acting plunger member adapted to be secured to the connecting vehicle, a spring housed in the socket member to receive the thrust of the plunger, a spring sleeved upon the plunger to receive the thrust of the socket member, and an electric circuit breaker controlling the ignition circuit for the respective motors operable through a change in the predetermined spaced relation of the vehicles to each other while in motion, and means adapted to apply the brakes of the respective vehicles, also operable through a change in the predetermined spaced relation of the respective vehicles to each other while in motion.

In testimony whereof, I sign this specification in the presence of two witnesses.

JOHN H. LOCK.

Witnesses:
S. E. THOMAS,
JNO. CONSIDINE, Jr.